US008292392B2

(12) United States Patent
Snyder et al.

(10) Patent No.: US 8,292,392 B2
(45) Date of Patent: Oct. 23, 2012

(54) SYSTEM AND METHOD FOR MODIFYING OPERATION OF AN INKJET PRINTER TO ACCOMMODATE CHANGING ENVIRONMENTAL CONDITIONS

(75) Inventors: Trevor J. Snyder, Newberg, OR (US); Walter Sean Harris, Portland, OR (US)

(73) Assignee: Xerox Corporation, Norwalk, CT (US)

( * ) Notice: Subject to any disclaimer, the term of this patent is extended or adjusted under 35 U.S.C. 154(b) by 272 days.

(21) Appl. No.: 12/837,230

(22) Filed: Jul. 15, 2010

(65) Prior Publication Data

US 2012/0013663 A1 Jan. 19, 2012

(51) Int. Cl.
*B41J 29/38* (2006.01)
*G01D 11/00* (2006.01)
*B41J 2/175* (2006.01)

(52) U.S. Cl. ................................ 347/14; 347/88; 347/99

(58) Field of Classification Search ................ 347/6, 14, 347/16, 84–86, 88, 99, 17
See application file for complete search history.

(56) References Cited

U.S. PATENT DOCUMENTS

| | | | | |
|---|---|---|---|---|
| 5,107,276 | A | 4/1992 | Kneezel et al. | |
| 5,489,925 | A | 2/1996 | Brooks et al. | |
| 5,610,638 | A * | 3/1997 | Courtney | 347/14 |
| 5,984,449 | A * | 11/1999 | Tajika et al. | 347/15 |

* cited by examiner

*Primary Examiner* — Jason Uhlenhake
(74) *Attorney, Agent, or Firm* — Maginot, Moore & Beck, LLP

(57) ABSTRACT

An inkjet printer operates to produce a print with at least one component operating at less than a normal operating parameter. The printer identifies an image density for an image to be printed and operates the printer with operational parameters different than normal operational parameters to enable printing operations before all of the components in the printer reach their operational parameters.

18 Claims, 4 Drawing Sheets

SYSTEM AND METHOD FOR MODIFYING OPERATION OF AN INKJET PRINTER TO ACCOMMODATE CHANGING ENVIRONMENTAL CONDITIONS

TECHNICAL FIELD

The present disclosure relates generally to inkjet printers and, more particularly, to operating inkjet printers with different operational parameters.

BACKGROUND

Drop-on-demand inkjet printers eject ink drops from printhead nozzles in response to pressure pulses generated within the printhead by either piezoelectric inkjet ejectors or thermal transducer inkjet ejectors. The pressure pulses propel the ejected ink drops onto a recording medium to form an ink image. In a typical piezoelectric inkjet printer, a controller applies electric pulses, referred to as firing signals, to the piezoelectric inkjet ejectors to produce the pressure pulses, which eject liquid ink drops from the nozzles. The controller may electronically address each inkjet ejector individually to enable a firing signal to be generated and delivered for each inkjet ejector. The firing signal causes a piezoelectric device of the inkjet ejector receiving the firing signal to bend or deform a diaphragm and pressurize a volume of liquid ink in a chamber adjacent the diaphragm. Ink from a reservoir in the printhead refills the inkjet channels as the diaphragm returns to its rest position and produces a negative pressure that pulls ink into the inkjet ejector.

An inkjet printer may print images with numerous types of ink including phase change ink, gel ink, aqueous ink, and the like. Phase change ink, also referred to as solid ink, remains in the solid phase at an ambient temperature, which is the temperature of the air surrounding the printer. Accordingly, before the printhead may eject phase change ink onto the image receiving member, the printer heats the solid ink to produce liquid ink suitable for ejection. Gel ink remains in a gelatinous state at ambient temperature or changes to a gel state between the liquid and solid states. Before the printhead ejects gel ink, the printer heats the ink to impart a lower viscosity to the ink that is suitable for ejection. Aqueous ink remains in a liquid phase at ambient temperature and, therefore, the printhead may eject aqueous ink without heating the ink.

Some inkjet printers configured to print images with phase change ink include an image receiving member in the form of a rotating drum or belt coated with a layer of release agent. The printhead ejects drops of liquid ink onto the layer of release agent to form an image. Next, the printer transfers the ink image to a recording medium, such as paper. The transfer is generally conducted in a nip formed by the image receiving member and a pressure roller, which is also called a transfix or transfer roller. The printer may include a heater to heat the image receiving member and/or the recording medium prior to entry in the transfixing nip. As the printer transports a recording medium through the nip, the nip transfers the fully formed image from the image receiving member to the recording medium and concurrently fixes the image to the recording medium. This technique of using heat and pressure at a nip to transfer and fix an image to a recording medium passing through the nip is typically known as "transfixing," a well known term in the art, particularly with phase change ink technology.

Some inkjet printers may undergo a warming period in which the printer heats one or more of the image receiving member, the ink, the transfix roller, and the recording medium to a respective operating temperature. During the warming period, the printer typically refrains from printing images until specific thermal operating design setpoints are reached. Of course, such restraint consumes energy resources without providing tangible output and increases the first print out time (FPOT), which is an important customer consideration. Reducing such periods of non-productive customer wait time is desirable.

SUMMARY

A solid ink inkjet printer has been provided, which modifies operation of the printer to enable the printer to print images before one or more operational parameters have been achieved. The printer includes an inkjet printhead having a plurality of inkjet ejectors, an imaging member positioned to receive ink ejected from the inkjet printhead as the imaging member rotates past the inkjet printhead, a transfix roller configured to move towards and away from the imaging member to form a nip with the imaging member selectively, an electrical circuit operatively connected to the plurality of inkjet ejectors to deliver firing signals to the inkjet ejectors selectively, a heater positioned proximate a media transport path in the inkjet printer, the heater being configured to heat media before the media reaches the nip formed with the transfix roller and the imaging member, a processor configured to receive image data representative of an image to be printed and to measure a density of the image to be printed, a plurality of temperature sensors, at least one temperature sensor being positioned proximate to each of the inkjet printhead, the imaging member, the transfix roller, and the heater to measure a temperature for each of the inkjet printhead, the imaging member, the transfix roller, and the heater, respectively, and a controller operatively connected to the electrical circuit, the transfix roller, the imaging member, the heater, the processor, and the plurality of temperature sensors, the controller being configured to operate the inkjet printer with reference to a first group of operational parameters in response to each of the temperature sensors measuring a temperature that corresponds to one of an operational inkjet printhead temperature, an operational imaging member temperature, an operational transfix roller temperature, and an operational heater temperature and to operate the inkjet printer with a second group of operational parameters in response to at least one of the temperature sensors measuring a temperature that corresponds to a temperature that is less than at least one of the operational inkjet printhead temperature, the operational imaging member temperature, the operational transfix roller temperature, and the operational heater temperature, respectively.

Another embodiment of a solid ink inkjet printer modifies operation of the printer to enable the printer to print images before one or more operational parameters have been achieved. The printer includes a processor configured to measure a density of an image to be printed, at least one temperature sensor configured to measure a temperature within the printer, and a controller operatively connected to the temperature sensor and to the processor, the controller being configured to operate the inkjet printer with reference to a first group of operational parameters in response to the measured temperature received from the temperature sensor being equal to or greater than a predetermined temperature and to operate the inkjet printer with at least one modified operational parameter in the first group of operational parameters in response to the measured temperature received from the temperature sensor being less than the predetermined temperature and the measured density of an image to be printed being less than a predetermined density.

BRIEF DESCRIPTION OF THE FIGURES

The foregoing aspects and other features of an inkjet printer, which modifies operation of an inkjet printer to enable the printer to print images before one or more operational parameters have been achieved are explained in the following description taken in connection with the accompanying figures.

DETAILED DESCRIPTION

Figure 1:
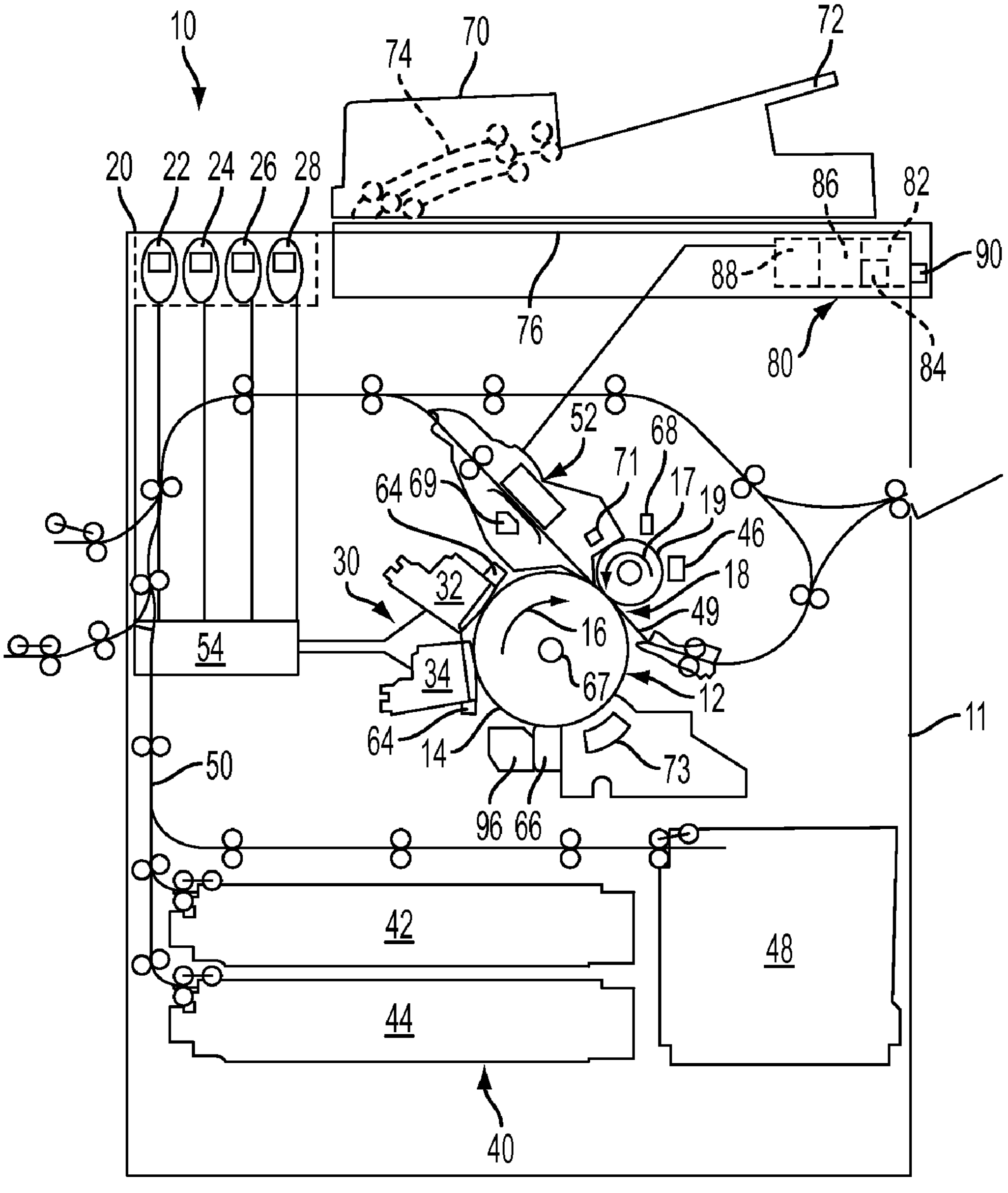
FIG. 1 is a schematic side elevational view of a prior art inkjet printer configured to be operated with the method shown in FIG. 4.

Reference is made to the drawings for a general understanding of the environment and the details for the printer disclosed herein. In the drawings, like reference numerals designate like elements. As used in this description, the term "printer" encompasses any apparatus that performs a print outputting function for any purpose, such as a digital copier, bookmaking machine, facsimile machine, multi-function machine, or the like. The description presented below describes an inkjet printer configured to print images with phase change ink. The printer may utilize one or more quick print operational parameters to reduce a time period for production of a first print following a period of reduced activity in the printer. The term "operational parameters" refers to a group of set points for operating components in the printer. As used in this document, the words "calculate" and "identify" include the operation of a circuit comprised of hardware, software, or a combination of hardware and software that reaches a result based on one or more measurements of physical relationships with accuracy or precision suitable for a practical application.

As shown in FIG. 1, an inkjet printer 10 configured to print images with phase change ink includes a frame 11 to which are connected directly or indirectly all its components and subsystems. The printer 10 includes an image receiving member, which is shown in the form of a drum 12, but can equally be in the form of a supported endless belt or the like. The drum 12 has an imaging surface 14 on which a printhead system 30 forms phase change ink images. An actuator 96 is operatively connected to the drum 12 to rotate the drum 12 in the direction 16. The actuator 96 is electrically connected to an electronic controller 80, which, among other functions, sends electronic signals to the actuator 96 to control the angular velocity of the drum 12. A heater 67 is operatively configured to heat the imaging surface 14 to a drum operating temperature. The heater 67 is electrically connected to and controlled by the controller 80. A typical drum operating temperature ranges from approximately fifty-five degrees to sixty-five degrees Celsius. As described herein, however, when utilizing the quick print parameters the printer 10 may print images when the temperature of the drum 12 is as low as forty degrees Celsius.

A transfix roller 19 of the printer 10 is rotatable in the direction 17 and is loaded against the surface 14 of the drum 12 to form a transfix nip 18. The printer 10 transfixes ink images from the surface 14 onto a media sheet 49 within the nip 18. An actuator 46 is operatively coupled to the transfix roller 19 to move the transfix roller towards and away from the drum 12. The actuator 46 is electrically connected to the electronic controller 80, which, controls the position of the transfix roller 19 relative to the surface 14 and the pressure with which the actuator 46 loads the transfix roller against the surface 14. The transfix roller 19 may include a heater 71, which is operatively configured to heat the transfix roller to a transfix roller operating temperature. The heater 71 is electrically connected to and controlled by the controller 80. Alternatively, radiant heat from the drum 12 may heat the transfix roller 19 to the transfix roller operational temperature.

The printer 10 also includes an ink delivery system 20, which includes at least one source 22 of phase change ink in the solid form. The printer 10, of FIG. 1, is a multicolor printer; accordingly, the illustrated ink delivery system 20 includes four (4) sources 22, 24, 26, 28 of phase change ink, representing four (4) different colors of phase change ink, for example, CMYK (cyan, magenta, yellow, black). The ink delivery system 20 further includes a melting and control apparatus 54 for melting or phase changing the solid form of the phase change ink into liquid ink. The ink delivery system 20 supplies the liquid ink to the printhead system 30, which includes at least one inkjet printhead assembly 32, 34 connected to the frame 11 in a position suitable to eject ink onto the surface 14.

Figure 2:
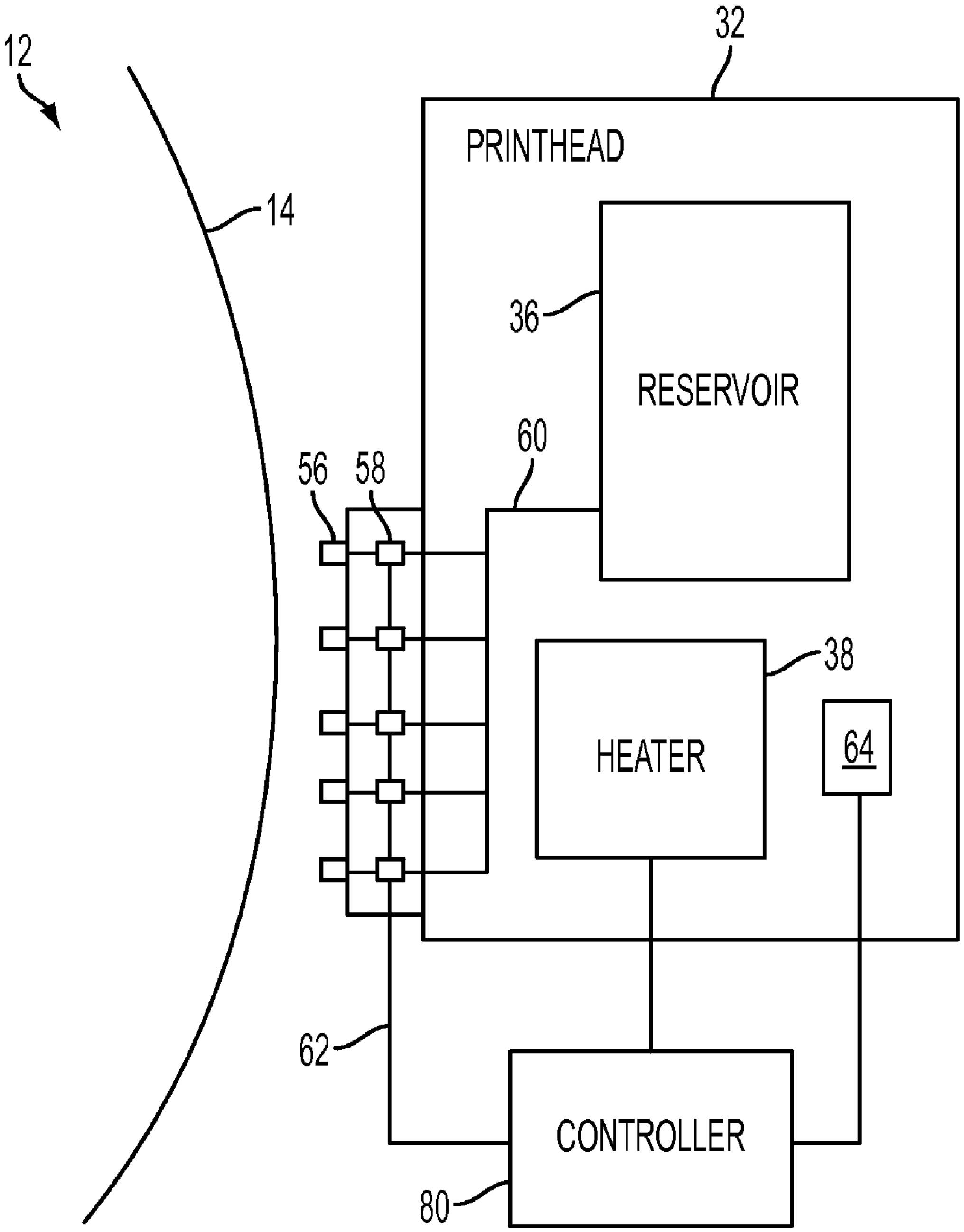
FIG. 2 is a block diagram side elevational view of a printhead assembly of the printer of FIG. 1.

As shown in FIG. 2, the inkjet printhead assembly 32 includes numerous inkjet ejectors 58 (only a few of which are illustrated) configured to receive ink from a reservoir 36 via an ink channel 60. The inkjet ejectors 58 may be any type of inkjet ejector including piezoelectric and thermal/resistive inkjet ejectors. An electrical circuit 62 connects each inkjet ejector 58 to the electronic controller 80 and delivers firing signals generated by the controller to the inkjet ejectors. The inkjet ejectors 58 eject ink drops through a corresponding nozzle 56 in response to receiving a firing signal. In particular, controller 80 may control the mass/volume of the ink drops ejected by the inkjet ejectors 58 by regulating the electrical characteristics of the firing signals. In particular, the mass of the ink drop ejected by the inkjet ejector may be directly proportional to the magnitude of the voltage of the firing signal. Additionally, the printhead assembly 32 includes at least one heater 38 positioned to heat the ink within the reservoir 36 and the channels 60 to a printhead operating temperature. The printhead operating temperature may be approximately one hundred twenty degrees Celsius. The printhead assembly 34 may include the same components as the printhead assembly 32.

As further shown in FIG. 1, the printer 10 includes a substrate supply and handling system 40. The substrate supply and handling system 40 may include sheet or substrate supply sources 42, 44, 48, of which supply source 48, for example, is a high capacity paper supply or feeder for storing and supplying image receiving substrates in the form of cut sheets 49. The substrate supply and handling system 40 also includes a substrate handling and treatment system 50, which includes a substrate heater 52. The substrate heater 52 is operatively positioned along a transport path and is configured to heat a recording medium to a recording medium operating temperature before the medium enters the nip 18. The substrate heater 52 is electrically connected to the controller 80, to enable the controller to control the temperature to which the substrate heater heats the recording medium. Generally, the substrate heater 52 becomes heated to its operating temperature of approximately sixty degrees Celsius more quickly than the drum heats to its operating temperature. The printer 10 may also include an original document feeder 70 that has a document holding tray 72, document sheet feeding and retrieval devices 74, and a document exposure and scanning system 76, each of which are known to those of ordinary skill in the art.

The printer 10 includes temperature sensors 64, 66, 68, 69 each of which are operatively positioned to measure the temperature of a particular component or subsystem. As shown in FIG. 1, the temperature sensors 64 measure the temperature of the printhead assemblies 32, 34, and the temperature sensor 66 measures the temperature of the surface 14 of the drum 12. The temperature sensor 68 measures the temperature of the transfix roll 19, and the temperature sensor 69 measures the temperature of the heater 52. Each of the temperature sensors are connected electrically to the controller 80 to provide the controller with an electrical signal representative of the temperature of the components and/or subsystems associated with the sensors. The temperature sensors may be any type of temperature sensors as known to those of ordinary skill in the art, such as thermocouples, electrically resistive temperature sensors, and the like.

As shown in FIG. 1, the printer 10 includes a drum maintenance unit 73, which applies and meters a release agent on the drum 12. In particular, the drum maintenance unit 73 applies a thin layer of release agent to the drum 12 before the printhead assemblies 32, 34 eject ink onto the drum. Once ejected, the ink coalesces on the layer of release agent applied to the drum 12. When the ink on the drum 12 and the media 49 pass through the nip 18, the ink transfers from the drum to the media. Specifically, the layer of release agent on the drum 12 facilitates this transfer. After the ink is transferred, the drum 12 rotates to enable the drum maintenance unit 73 to apply and meter additional release agent on the drum. The reapplication of release agent and the metering action helps to lubricate the surface 14 of the drum as well as remove most excess oil, ink, and other debris that may have rested on the surface 14.

As briefly described above, the controller 80 operates and controls various subsystems, components, and functions of the printer 10. The controller 80, for example, is a self-contained, dedicated mini-computer having a processor or central processor unit ("CPU") 82 with electronic storage 84. In some embodiments, the controller 80 may include a display or user interface (UI) 86 and/or a sensor input and control circuit 88. The CPU 82 reads, captures, prepares, and manages the electronic flow of image data between image data input sources, such as the scanning system 76 or an online/workstation connection 90, and the printhead assemblies 32, 34. The CPU 82 may also process the image data to measure an image density of the image to be printed. The image density is a measure of the number of ink drops per unit area of the image to be printed. The controller 80 determines, accepts, and/or executes related subsystem and component controls, for example, from operator inputs via the user interface 86.

The controller 80 may be implemented with general or specialized programmable processors that execute programmed instructions. The instructions and data required to perform the programmed functions may be stored in memory associated with the processors or controllers. The processors, their memories, and interface circuitry may be provided on a printed circuit card or provided as a circuit in an application specific integrated circuit (ASIC). Each of the circuits may be implemented with a separate processor or multiple circuits may be implemented on the same processor. Alternatively, the circuits may be implemented with discrete components or circuits provided in VLSI circuits. Also, the circuits described herein may be implemented with a combination of processors, ASICs, discrete components, or VLSI circuits. Multiple controllers/processors configured to communication with the controller 80 may also be used.

The controller 80 operates the printer 10 with reference to numerous operational parameters. The operational components of the printer 10 of FIG. 1 include a pressure of the transfix roller 19 against the surface 14 of the drum 12, an angular velocity of the drum and the transfix roller, electrical characteristics of the firing signal waveforms, a speed of the recording medium transported by the substrate supply and handling system 40, and the like. The printer 10 may be operated according to a "normal" group of operational parameters, referred to herein as the "normal parameters", to enable the printer to perform a wide range of printing activities. When the printer is operated with reference to the normal group of operational parameters the components in the printer have reached their typical operational set points and can be operated with reference to the normal operational parameters to print a wide range of images with different image densities, color combinations, and the like. In one embodiment, the components operated with reference to the normal group of operational parameters include the transfix roller 19, the drum 12, the printhead assemblies 32, 34, and the media heater. Once these components have reached an operational temperature set point, these components may be operated with reference to the normal operational parameters to perform printing operations.

The controller 80 may reduce the power consumption of the printer 10 by disconnecting components from electrical power or reducing the flow of electrical power to the components. The controller may reduce power consumption in the printer in response to detecting the CPU 82 not receiving image data for a predetermined time period. During reduced power consumption operations, the controller 80 may permit the temperatures of components within the printer to fall below their respective operating temperatures in order to reduce the electrical power consumed by these devices. For example, the controller may maintain the melting assembly 54 at approximately thirty-five to forty-five degrees Celsius, the drum 12 at approximately forty to about fifty degrees Celsius, and the printhead assemblies 32, 34 at approximately ninety to about one hundred and five degrees Celsius to reduce power consumption. Alternatively, the controller may turn these devices off completely and let their temperature be controlled by the ambient conditions. While operating the printer with reduced power consumption, the controller 80 continues to monitor the CPU 82 for the receipt of image data.

In response to the printer needing to achieve some degree of operational status, the controller 80 may operate the printer 10 with a different group of operating parameters. Specifically, by utilizing a group of "quick print parameters" the controller enables the printer 10 to print images on recording medium before components in the printer have reached their operational set points. For example, receipt of image data may cause the controller to commence supplying electrical power to components to bring the components to their normal operational states. However, the thermal mass of each component, among other factors, requires a predetermined time period (the warming period) to elapse before the components reach their respective operating temperatures. For example, the drum 12 requires a significant amount of time to reach its operating temperature. Therefore, the printer may be operated with reference to another group of operational parameters to enable printing while the drum is achieving its operating temperature. This other group of operational parameters is configured to compensate for the reduced drum temperature. For example, the drum rotational speed may be decreased to enable release agent to coat the drum properly and/or to allow a longer dwell time for the transfer of ink during transfix. Other components, such as the transfix roller, may be operated with greater pressures than the normal operating pressure to facilitate transfer of ink images from the cooler drum to media passing through the nip formed by the transfix roller and the drum. The preheater may be operated at a higher setpoint since the lower thermal mass of the preheater can be heated much more quickly than the thermal mass of the imaging drum. Alternatively, the mass of the ink drops ejected by the printheads may be increased slightly or the x or y image resolutions may be increased in order to accommodate lower thermal conditions and still achieve adequate color saturation.

Figure 3:
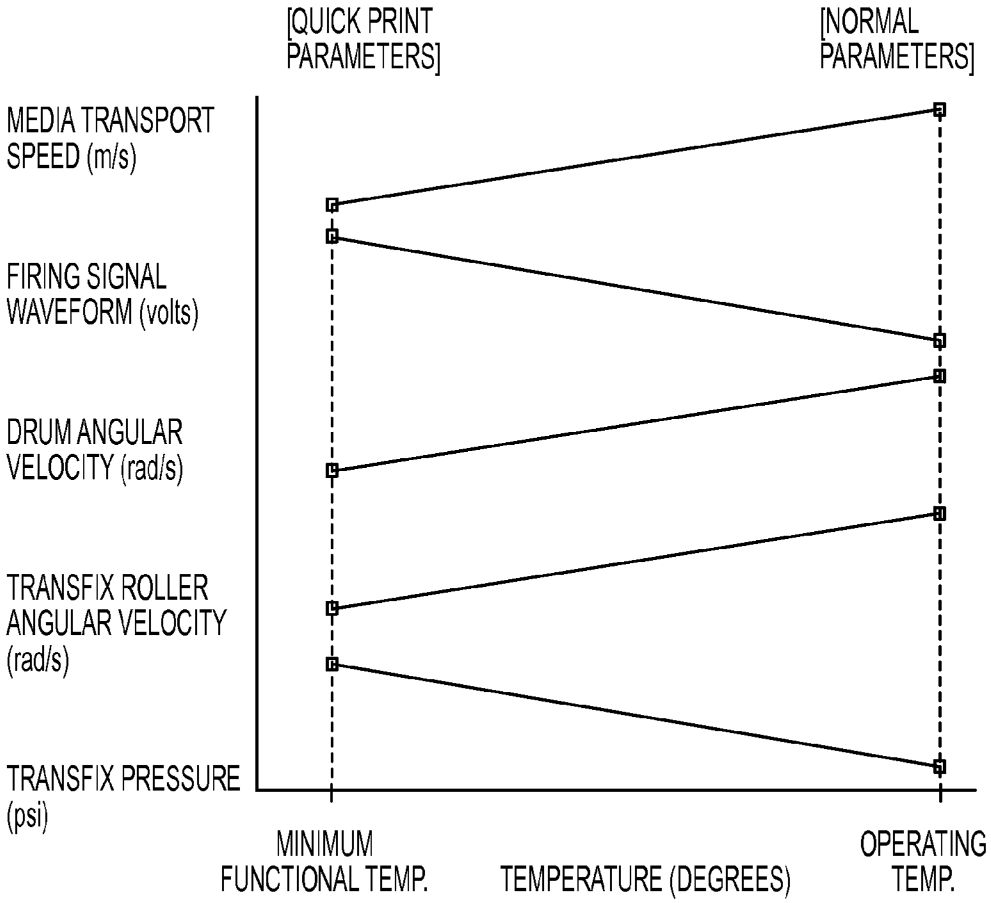
FIG. 3 is a graph of illustrating operating parameter values of the printer of FIG. 1.

As shown in FIG. 3, the operational parameters are plotted against the temperature of one of the printer components (interpolated values extend between the quick print parameters and the normal parameter, as described below). In response to each printer component reaching a minimum functional temperature the controller 80 may operate the printer 10 with the quick print parameters. As the temperature of the heated components increases, the controller 80 may further adjust the operational parameters until the components have reached their respective operational temperatures, at which point the controller may operate the printer 10 with the normal operational parameters. For example, in response to the drum 12 having a temperature below its operating temperature, the controller 80 may operate the drum and the transfix roller 19 at a decreased angular velocity associated with the quick print parameters in order to reduce the transfix speed of the printer. As the term is used herein, the transfix speed refers to the rate at which is ink is transferred to a recording medium being transported through the nip 18. In one embodiment, at the drum angular velocity corresponding to the minimum functional temperature of the drum 12, the transfix speed may be reduced to three inches per second, whereas when the drum 12 and each other heated component are heated fully the drum angular velocity may be approximately forty to fifty-two inches per second. The reduced transfix velocity better enables the ink ejected upon the "cold" surface 14 to transfer to the recording medium transported through the nip 18. Generally, the controller 80 reduces the angular velocity of the drum 12 and the roller 19 in response to one or more of the temperature of the surface 14, the temperature of the roller 19, and the temperature of the printhead assemblies 32, 34 being less than their respective operating temperatures.

Similarly, if the sensor 69 measures a temperature of the heater 52 that corresponds to the minimum functional temperature, the controller 80 may reduce the media transport speed from an increased value associated with the normal parameters to a decreased value associated with the quick print parameters. The reduced media transport speed enables a recording medium transported by the substrate supply and handling system 40 to remain near the heater 52 for an extended time period as compared to the normal parameters. Thus, even though the heater 52 is operating at or near the minimum temperature the reduced media transport speed enables the heater to heat the recording media to a temperature sufficient to receive an ink image.

The controller 80 may increase the pressure of the transfix roller 19 against the drum 12 from a decreased value associated with the normal parameters to an increased value associated with the quick print parameters. The controller 80 increases the pressure of the transfix roller against the drum 12 in response to one or more of the temperature of the surface 14, the temperature of the roller 19, and the temperature of the printhead assemblies 32, 34 being less than their respective operating temperatures. The increased transfix pressure assists in transferring the ink image from the surface 14 to the recording medium transported through the nip.

The controller 80 may also adjust the waveform of the firing signals sent to the inkjet ejectors in response to the measured temperatures of the heated components and, in particular, the measured temperature of the printhead assemblies 32, 34. The viscosity of the ink within the printhead assemblies 32, 34 increases in response to the printhead assemblies being maintained at a temperature less than their operating temperature. To account for the increased viscosity at or near the minimum functional temperature, the controller 80 may modify the waveform of the firing signals. For example, as shown in FIG. 3, a greater magnitude of voltage may deform to a greater extent the piezoelectric member within each of the inkjet ejectors 58 and generate a stronger ink ejecting force, which is suitable to eject the ink having an increased viscosity.

The printer 10 may continue to receive image data after the controller 80 has selected the quick print parameters to operate the printer. Accordingly, the temperatures of the printer components continue to increase during this time period although they still remain less than the respective normal operating temperatures. In response to these changes, the controller 80 may continue to modify the quick print parameters used to operate the printer. Specifically, the controller 80 may interpolate a value along the curves illustrated in FIG. 3 for one or more of the printer components. The curves in FIG. 3 are linear, however, the controller 80 may be configured to interpolate values along any type of curve or other data arrangement. The controller 80 may continue to modify the quick print parameters through the above-described interpolation process until each of the printer components having a normal operational parameter have reached their respective operating temperatures, at which point the controller operates the printer with reference to the normal parameters.

The controller 80 reduces the first print out time by configuring the printer to operate with the quick print parameters. Use of the quick print parameters decreases the first print time because printing begins in response to printer components reaching their respective minimum functional temperatures, which occurs in less time than is required to heat the components to their respective operating temperatures. Accordingly, the quick print parameters enable the solid ink inkjet printer to have a first print time closer to, equal to, or less than the first print time of printers that eject aqueous inks and other inks that require less heating than phase change ink.

The controller 80 reduces energy consumption of the printer 10 by operating the printer with the quick print parameters. The printer 10 consumes electrical energy to heat printer components to their respective operating temperatures and also to maintain the components at their respective operating temperatures. By beginning to print images before each of the printer components has reached its respective operating temperature, the printer 10 reduces the time that each component is maintained at its operating temperature for a particular print job. Additionally, the printer 10 may completely print the images associated with some image data before all normal operational parameters have been reached, thereby increasing printer productive with reduced power consumption. For example, the printer 10 may complete a print job, which requires the printer to print images on one to two letter sized sheets of paper without heating the drum 12 to its operating temperature.

As briefly described above, the controller 80 may determine an image density of the image data. The controller 80 may process the image density to calculate an average image density for each ink color required to print the image data. Additionally or alternatively, the controller 80 may process the image density to determine an image density for each individual printhead of the printhead assemblies 32, 34. The controller 80 may include a processor specifically configured to receive image data and determine the image density; alternatively, programmed instruction executed by a multipurpose processor may determine the image density.

The controller 80 may be configured to use the quick print parameters for printer operation when the image density of the image data is below a threshold image density. Images having a greater density than the threshold may suffer some image defects when the printer is operated with reference to parameters other than the normal operational parameters. Additionally, less dense images enable the controller to capitalize on the availability of liquid ink within the ink channels 60 before all of the phase change ink in a printhead is completely melted. In particular, the threshold image density may be set to a value that enables an image to be printed that has a density corresponding to the amount of ink within the ink channels 60 and, in some embodiments, a portion of the ink within the reservoir 36 that is nearest the heater 38 as well. The heater 38 heats the ink within the ink channels 60 and the ink in the reservoir 36 that is immediately proximate the heater more quickly than the ink in the reservoir 36 that is more remote from the heater. Therefore, the ink within the ink channels 60 and the reservoir 36 become available for printing at different times. Thus, the image density threshold enables the controller to conserve electrical energy by determining whether all of the ink within the reservoir 36 needs to be melted to perform a printing operation after a period of inactivity.

In a further effort to conserve electrical energy, the controller 80 may modify the order of a group of images to be printed with reference to the image density of each image. As described above, images having an image density less than a threshold image density may be printed with the printer being operated with reference to operational parameters other than the normal operational parameters. Accordingly, the controller 80 may print these "low density" images before printing the images having an image density above the threshold density to enable printing operations before normal operational conditions are reached. For example, the controller 80 may receive a plurality of images in a first order and then process the image data to determine the image density of each image. Next, the controller may re-order the images to enable the less dense images to be printed before the normal operational parameters are achieved. Additionally, the threshold density may be adjusted by the controller as described above as the components transition to the normal operating conditions. The changing threshold may enable images not printed at the minimum functional conditions to be printed before the normal operating conditions are reached.

Figure 4:
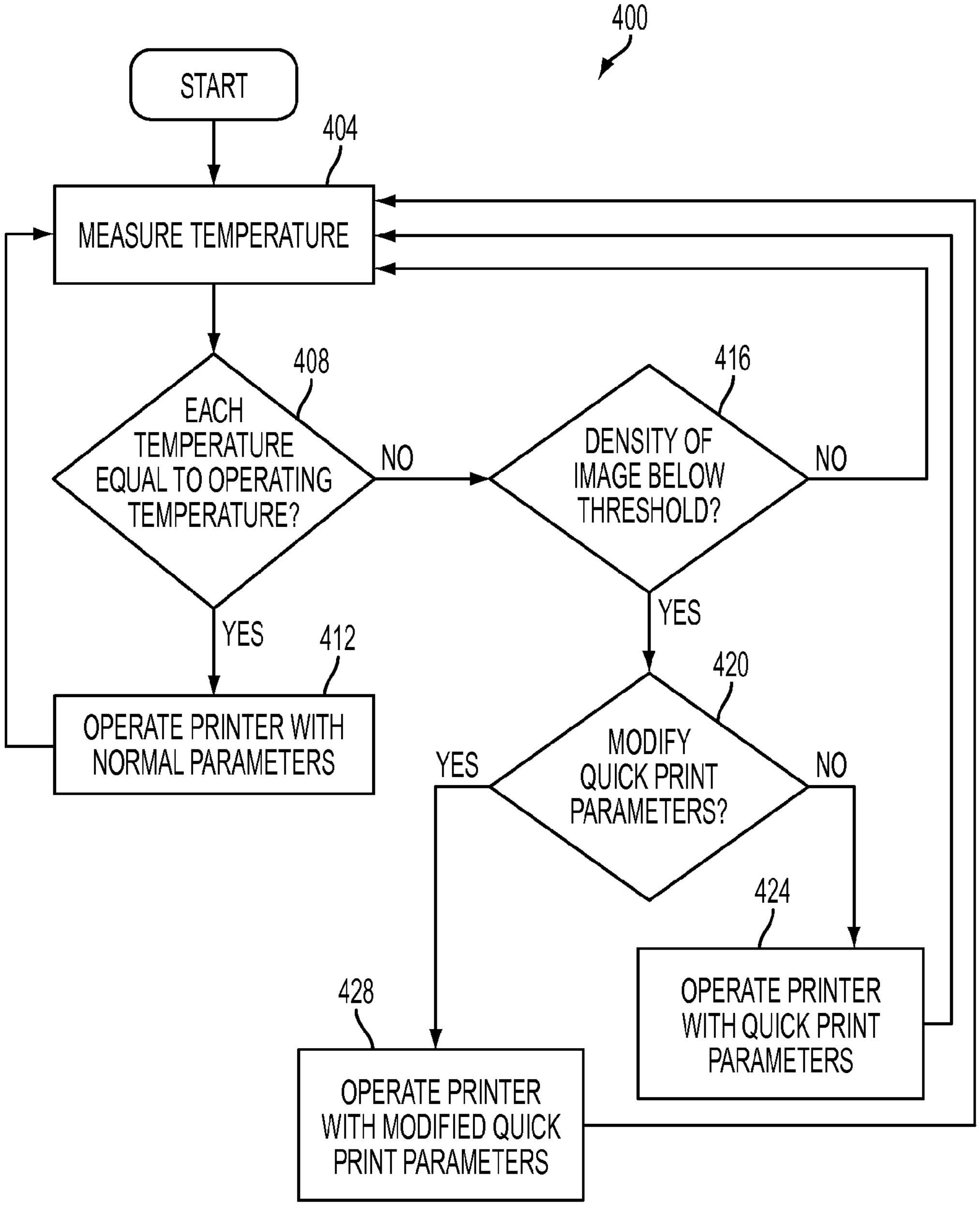
FIG. 4 is a flowchart depicting an exemplary method of operating an inkjet printer, such as the one shown in FIG. 1.

The controller 80 may implement the method 400 for operating the printer 10 depicted in FIG. 4. After receiving image data, the controller 80 monitors the temperatures measured by the temperature sensors 64, 66, 68, 69 (block 404). If the controller 80 determines that each of the components having a normal operating parameter has a temperature sufficiently close to its respective operating temperature then the controller operates the printer 10 according to the normal parameters (blocks 408 and 412). If, however, one or more of the components has a temperature less than its respective operating temperature, the controller 80 identifies the image density of the image data (block 416). Typically, the drum 12 is the printer component having a temperature below its operating temperature after a period of power reduction or termination. Additionally, the drum 12 requires more time to reach its operating temperature than most printer components, whereas the media heater 52 generally reaches its operating temperature more quickly. Therefore, the method 400 typically adjusts the parameters for operating components having normal operational parameters in accordance with the temperature measured for the drum 12. In particular, controller 80 reduces the transfix speed (drum angular velocity) to account for the reduced temperature of the drum 12.

Next, the controller 80 identifies and compares the image density of the image data to a threshold image density (block 416). An image density above the threshold density signals to the controller 80 that the printer components cannot be currently operated to print the image without some unacceptable image quality defects. Therefore, the controller 80 continues to monitor the increasing temperature of the heated components (block 404). An image density below the threshold density signals to the controller 80 that the quick print parameters may be utilized to print the image.

Subsequently, the controller 80 determines if the quick print parameters should be modified (block 420). The controller 80 may utilize each of the quick print parameters, as represented by the points on the left side of the graph of FIG. 3, when each measured temperature of the components having a normal operational parameter corresponds to the minimum functional temperatures (block 428). Frequently, some of the components may have been heated to a temperature greater then their respective minimum functional temperature but less than their respective operating temperature. Accordingly, the printer 10 may modify the quick print parameters to an interpolated value as shown in FIG. 3 (block 424). After beginning to print with the quick print parameters, the controller 80 continues to monitor the temperature of the heated components during the print cycle (block 404). In particular, the printer 10 may begin a print cycle using the quick print parameters and then switch to the normal parameters once each of the heated components has reached its respective operating temperature. As shown in FIG. 3, switching to the normal parameters increases the transfix speed and overall print speed, because the controller 80 increases the angular velocity of the drum 12 as the drum approaches its operating temperature. Some embodiments of the printer 10 may not monitor the image density, in which case after determining that one or more of the measured temperatures are below their respective operating temperature (block 408) the controller 80 may modify the quick print parameters (block 420).

It will be appreciated that some or all of the above-disclosed features and other features and functions or alternatives thereof, may be desirably combined into many other different systems, apparatus, devices, or applications. Various presently unforeseen or unanticipated alternatives, modifications, variations, or improvements therein may be subsequently made by those skilled in the art, which are also intended to be encompassed by the following claims.

What is claimed is:

1. An inkjet printer configured to print images with phase change ink comprising:

an inkjet printhead having a plurality of inkjet ejectors;

an imaging member positioned to receive ink ejected from the inkjet printhead as the imaging member rotates past the inkjet printhead;

a transfix roller configured to move towards and away from the imaging member to form a nip with the imaging member selectively;

an electrical circuit operatively connected to the plurality of inkjet ejectors to deliver firing signals to the inkjet ejectors selectively;

a heater positioned proximate a media transport path in the inkjet printer, the heater being configured to heat media before the media reaches the nip formed with the transfix roller and the imaging member;

a processor configured to receive image data representative of an image to be printed and to measure a density of the image to be printed;

a plurality of temperature sensors, at least one temperature sensor being positioned proximate to each of the inkjet printhead, the imaging member, the transfix roller, and the heater to measure a temperature for each of the inkjet printhead, the imaging member, the transfix roller, and the heater, respectively; and a controller operatively connected to the electrical circuit, the transfix roller, the imaging member, the heater, the processor, and the plurality of temperature sensors, the controller being configured to operate the inkjet printer with reference to a first group of operational parameters in response to each of the temperature sensors measuring a temperature that corresponds to one of an operational inkjet printhead temperature, an operational imaging member temperature, an operational transfix roller temperature, and an operational heater temperature and to operate the inkjet printer with a second group of operational parameters in response to at least one of the temperature sensors measuring a temperature that corresponds to a temperature that is less than at least one of the operational inkjet printhead temperature, the operational imaging member temperature, the operational transfix roller temperature, and the operational heater temperature, respectively.

2. The inkjet printer of claim 1, the controller being further configured to operate the inkjet printer with reference to the second group of operational parameters in response to the measured density of an image to be printed being less than a predetermined density.

3. The inkjet printer of claim 1 wherein the second group of operational parameters include a transfix pressure, a transfix speed, an imaging member speed, a firing signal waveform, an ink drop mass, an image resolution, and a media transport speed.

4. The inkjet printer of claim 3, the controller being further configured to modify at least one operational parameter in the second group of operational parameters with reference to an interpolation between an operational parameter in the first group of operational parameters and a corresponding operational parameter in the second group of operational parameters.

5. The inkjet printer of claim 4, the controller being configured to modify the transfix pressure in the second group of operational parameters with reference to the measured temperatures received from the temperature sensors and each of the operational temperatures until the operational temperatures for each of the operational parameters is reached.

6. The inkjet printer of claim 4, the controller being configured to modify the transfix speed in the second group of operational parameters with reference to the measured temperatures received from the temperature sensors and each of the operational temperatures until the operational temperatures for each of the operational parameters is reached.

7. The inkjet printer of claim 4, the controller being configured to modify a voltage of the firing signal waveform in the second group of operational parameters with reference to the measured temperatures received from the temperature sensors and each of the operational temperatures until the operational temperatures for each of the operational parameters is reached.

8. The inkjet printer of claim 4, the controller being configured to modify the imaging member speed in the second group of operational parameters with reference to the measured temperatures received from the temperature sensors and each of the operational temperatures until the operational temperatures for each of the operational parameters is reached.

9. The inkjet printer of claim 4, the controller being configured to modify the media transport speed in the second group of operational parameters with reference to the measured temperatures received from the temperature sensors and each of the operational temperatures until the operational temperatures for each of the operational parameters is reached.

10. The inkjet printer of claim 1, the controller being further configured to modify an order of images to be printed with reference to the measured density of each image received from the processor.

11. An inkjet printer comprising:

a processor configured to measure a density of an image to be printed;

at least one temperature sensor configured to measure a temperature within the printer; and a controller operatively connected to the temperature sensor and to the processor, the controller being configured to operate the inkjet printer with reference to a first group of operational parameters in response to the measured temperature received from the temperature sensor being equal to or greater than a predetermined temperature and to operate the inkjet printer with at least one modified operational parameter in the first group of operational parameters in response to the measured temperature received from the temperature sensor being less than the predetermined temperature and the measured density of an image to be printed being less than a predetermined density, the first group of operational parameters including a transfix pressure, a transfix speed, an imaging member speed, a firing signal waveform, an ink drop mass, an image resolution, and a media transport speed.

12. The inkjet printer of claim 11, the controller being further configured to interpolate the modification of the at least one operational parameter with reference to an interpolation between a minimum operational parameter at a first temperature and the operational parameter.

13. The inkjet printer of claim 12, the controller being configured to increase the transfix pressure in the first group of operational parameters with reference to the measured temperature received from the temperature sensor, the first temperature, and the predetermined temperature until the predetermined temperature is reached.

14. The inkjet printer of claim 12, the controller being configured to decrease the transfix speed in the first group of operational parameters with reference to the measured temperature received from the temperature sensor, the first temperature, and the predetermined temperature until the predetermined temperature is reached.

15. The inkjet printer of claim 12, the controller being configured to increase a voltage of the firing signal waveform in the first group of operational parameters with reference to the measured temperature received from the temperature sensor, the first temperature, and the predetermined temperature until the predetermined temperature is reached.

16. The inkjet printer of claim 12, the controller being configured to increase the imaging member speed with reference to the measured temperature received from the temperature sensor, the first temperature, and the predetermined temperature until the predetermined temperature is reached.

17. The inkjet printer of claim 12, the controller being configured to increase the media transport speed with reference to the measured temperature received from the temperature sensor, the first temperature, and the predetermined temperature until the predetermined temperature is reached.

18. The inkjet printer of claim 11, the controller being further configured to modify an order of images to be printed with reference to the measured density of each image received from the processor.

* * * * *